(12) United States Patent
Walker et al.

(10) Patent No.: US 6,839,683 B1
(45) Date of Patent: Jan. 4, 2005

(54) SYSTEMS AND METHODS USING A REPRESENTATION OF A STORED BENEFIT TO FACILITATE A TRANSACTION

(75) Inventors: Jay S. Walker, Ridgefield, CT (US); Wen Yan Lin, New York, NY (US); James A. Jorasch, Stamford, CT (US); Magdalena Mik, Greenwich, CT (US); Keith Bemer, New York, NY (US); Timothy A. Palmer, Stamford, CT (US); Joseph R. Rutledge, Easton, CT (US); Marisa S. Doré, Stamford, CT (US)

(73) Assignee: Walker Digital, LLC, Stamford, CT (US)

(*) Notice: Subject to any disclaimer, the term of this patent is extended or adjusted under 35 U.S.C. 154(b) by 0 days.

(21) Appl. No.: 09/504,180

(22) Filed: Feb. 15, 2000

(51) Int. Cl.[7] .......................... G06F 17/60; G06F 17/00
(52) U.S. Cl. ....................................................... 705/14
(58) Field of Search ......................................... 705/14

(56) References Cited

U.S. PATENT DOCUMENTS

| | | | |
|---|---|---|---|
| 4,341,951 A | 7/1982 | Benton | |
| 4,554,446 A | 11/1985 | Murphy et al. | |
| 4,799,156 A | 1/1989 | Shavit et al. | |
| 4,882,675 A | 11/1989 | Nichtberger et al. | |
| 4,947,028 A | 8/1990 | Gorog | |
| 4,949,256 A | 8/1990 | Humble | 364/401 |
| 4,992,940 A | 2/1991 | Dworkin | |
| 5,056,019 A * | 10/1991 | Schultz et al. | 364/405 |
| 5,253,165 A | 10/1993 | Leiseca et al. | |
| 5,256,863 A | 10/1993 | Ferguson et al. | |
| 5,319,542 A | 6/1994 | King, Jr. et al. | |
| 5,434,394 A | 7/1995 | Roach et al. | |
| 5,483,444 A * | 1/1996 | Heintzeman et al. | 364/401 |
| 5,557,721 A | 9/1996 | Fite et al. | |
| 5,611,051 A | 3/1997 | Pirelli | |
| 5,612,527 A | 3/1997 | Ovadia | |
| 5,710,886 A | 1/1998 | Christensen et al. | |
| 5,739,512 A | 4/1998 | Tognazzini | |
| 5,758,328 A | 5/1998 | Giovannoli | |
| 5,761,648 A | 6/1998 | Golden et al. | 705/14 |
| 5,794,207 A | 8/1998 | Walker et al. | 705/23 |
| 5,806,044 A | 9/1998 | Powell | |
| 5,806,045 A * | 9/1998 | Biorge et al. | 705/14 |

(List continued on next page.)

FOREIGN PATENT DOCUMENTS

| | | |
|---|---|---|
| JP | 10214284 | 8/1998 |
| WO | WO 97/16797 | 5/1997 |
| WO | WO 97/23838 | 7/1997 |
| WO | WO 98/21713 | 5/1998 |

OTHER PUBLICATIONS

"WWW.PRIZEPOINT.COM is a Live On the Internet!; New 'Reward Entertainment' Meets Needs of Growing MassMarket Audience Online" Business Wire Feb. 1, 1999.

(List continued on next page.)

*Primary Examiner*—James W. Myhre
(74) *Attorney, Agent, or Firm*—Michael D. Downs

(57) ABSTRACT

Systems and methods are provided using a stored benefit to facilitate a transaction in which a buyer offers to purchase a product. According to one embodiment, offer information, including an offer amount, is received from a buyer. The offer information may be received, for example, via a Web page. An indication that the buyer is willing to redeem one or more stored benefits is also received. A stored benefit may be, for example, a token associated with the buyer when he or she applies for a service. A value associated with the stored benefit is determined, and the offer information is evaluated based on the offer amount, the value associated with the stored benefit, and an amount associated with a product. According to one embodiment, the offer information includes a product category, and the product provided to the buyer is determined based on the product category.

50 Claims, 10 Drawing Sheets

U.S. PATENT DOCUMENTS

| | | | |
|---|---|---|---|
| 5,809,144 A | 9/1998 | Sirbu et al. | |
| 5,822,736 A | 10/1998 | Hartman et al. | |
| 5,832,457 A | 11/1998 | O'Brien et al. | |
| 5,842,178 A | 11/1998 | Giovannoli | |
| 5,845,259 A | 12/1998 | West et al. | |
| 5,855,007 A | 12/1998 | Jovicic et al. | 705/14 |
| 5,855,008 A | 12/1998 | Goldhaber et al. | 705/14 |
| 5,857,175 A | 1/1999 | Day et al. | |
| 5,864,822 A | 1/1999 | Baker, III | 705/14 |
| RE36,116 E | 2/1999 | McCarthy | 705/16 |
| 5,878,139 A | 3/1999 | Rosen | |
| 5,878,400 A | 3/1999 | Carter, III | 705/20 |
| 5,878,401 A | 3/1999 | Joseph | |
| 5,883,810 A | 3/1999 | Franklin et al. | |
| 5,887,271 A | 3/1999 | Powell | |
| 5,890,136 A | 3/1999 | Kipp | |
| 5,907,830 A | 5/1999 | Engel et al. | |
| 5,923,016 A | 7/1999 | Fredregill et al. | |
| 5,924,078 A | 7/1999 | Naftzger | |
| 5,924,080 A | 7/1999 | Johnson | |
| 5,937,391 A | 8/1999 | Ikeda et al. | 705/14 |
| 5,970,469 A | 10/1999 | Scroggie et al. | |
| 5,983,196 A * | 11/1999 | Wendkos | 705/14 |
| 6,009,412 A | 12/1999 | Storey | 705/14 |
| 6,012,039 A * | 1/2000 | Hoffman et al. | 705/14 |
| 6,014,634 A | 1/2000 | Scroggie et al. | |
| 6,017,157 A | 1/2000 | Garfinkle et al. | |
| 6,018,718 A | 1/2000 | Walker et al. | 705/14 |
| 6,035,284 A | 3/2000 | Straub et al. | |
| 6,076,101 A * | 6/2000 | Kamakura et al. | 709/206 |
| 6,085,168 A | 7/2000 | Mori et al. | |
| 6,119,099 A | 9/2000 | Walker et al. | |
| 6,138,911 A * | 10/2000 | Fredregill et al. | 235/383 |
| 6,178,408 B1 * | 1/2001 | Copple et al. | 705/14 |
| 6,193,154 B1 | 2/2001 | Phillips et al. | |
| 6,240,397 B1 * | 5/2001 | Sachs | 705/27 |
| 6,249,772 B1 | 6/2001 | Walker et al. | |
| 6,251,017 B1 * | 6/2001 | Leason et al. | 463/42 |
| 6,266,647 B1 * | 7/2001 | Fernandez | 705/14 |
| 6,266,651 B1 | 7/2001 | Woolston | |
| 6,275,811 B1 * | 8/2001 | Ginn | 705/10 |
| 6,278,980 B1 * | 8/2001 | Wendkos | 705/14 |
| 6,370,513 B1 | 4/2002 | Kolawa et al. | |
| 6,415,261 B1 * | 7/2002 | Cybul et al. | 705/14 |
| 6,512,570 B2 | 1/2003 | Garfinkle et al. | |

OTHER PUBLICATIONS

"In Online Auction First, Auction Universe Offers a 10% Rebate On Purchases During April" Business Wire Apr. 6, 1999.

Vickers, Amy, "Clicks mean points in the loyalty game; The success of offline loyalty schemes has been the model for online imitations, but consumers need greater flexibility" New Media Age, Section: Loyalty; p. 12–16 Apr. 29, 1999.

Corey, Matt, "Clip ''n' pay; proposed increase in coupon processing fees raises production cost issues" Food and Beverage Marketing, Section: No. 6, vol. 18, p. 18; ISSN: 0731–3799 Jun. 1, 1999.

Petersen, Scot, "New breed of auctioneer moving into mainstream; online auctions; Industry Trend or Event" PC Week, p. 30; ISSN: 0740–1604 Nov. 8, 1999.

"Creating reward programmes that really encourage loyalty; Loyalty schemes need to be simple, encourage redeeming and recognise long–standing customers says David Rankin" Brand Strategy, Section: Features; p. 8 Jan. 21, 2000.

"Using Aadvantage Miles" American Airlines—American Eagle, download Feb. 10, 2000.

"PrizePoint Entertainment: Learn More" http://www-.prizepoint.com, download Feb. 10, 2000.

"Surfbuzz" http://www.surfbuzz.com download date Jun. 8, 2000.

Naik, Gautam, "In Digital Dorm, Click on Return for Soda", The Wall Street Journal Online, undate.

Brochure: "Reaching Out In New Directions", First Data Corporation, Merchant Service, undated.

"FAQ: CSH Coke Machine Information", FAQ, May 23, 1994, vol. 1.2, (http //www cs uu nl/wais/html/na–dir/ csh–coke–machine–info html).

Website: "Groceries Online", (http //www groceries–online com/), Copyright 1996 Groceries Online, Inc.

Website: "Computer Science House: Projects: Drink Machine", (http //www csh rit edu/proj/drink html), download date: Jan. 29, 1998.

Fallon, James, "Safeway Puts Ordering into Customers' Palms", Executive Technology, Jan. 1999.

Website: "SaveSmart—How SaveSmart Works for Consumers", (http //www savesmart com/consumer_howitworks html), download date: Jan. 17, 1999.

Website: "welcome to planet U, providers of U–pons— Internet Coupons", (http //www planetu com/), download date: Mar. 16, 1999.

Lazarus, David, "E–Commerce, Japanese Style", Wired Online, (http //www wired com), Jun. 7, 1999.

"Wal–Mart vs Amazon: The fight begins", Yahoo News, (http //www yahoo com), Jun. 9, 1999.

"Circuit City to Integrate E–Commerce With Store Shopping: Retailer's E–Superstore—www Circuitcity com—to Open in Jul. ", PR Newswire, Jun. 15, 1999, Section: Financial News.

Frederick, James, "Walgreens gears for opening of its own Internet pharmacy", Drug Store News, Jul. 19, 1999, vol. 9, No. 7.

"Internet Wine Gift Company Offers Answer to Recent Legislation", Source: Send.com, Aug. 10, 1999.

* cited by examiner

| BUYER IDENTIFIER 302 | NAME 304 | MAILING ADDRESS 306 | ELECTRONIC MAIL ADDRESS 308 | PAYMENT IDENTIFIER 310 | NUMBER OF AVAILABLE TOKENS 312 |
|---|---|---|---|---|---|
| B101 | JOHN SMITH | 123 MAIN STREET CENTERVILLE, CT 12345 | JSMITH@AOL.COM | 1111-2222-3333-4444 | 5 |
| B102 | DONNA WEST | 100 EAST AVENUE, APT 5J NEW YORK, NY 10001 | WEST@HOME.COM | 1234-1234-1234-1234 | 10 |
| B103 | JANE GOLD | 10-10 NORTH DRIVE WASHINGTON, DC 20001 | GOLD@WORK.COM | 5678-5678-5678-5678 | 1 |
| B104 | DAVID WHITE | 15 HIGH PARK ROAD NEW YORK, NY 10002 | DWHITE@AOL.COM | 1010-2020-3030-4040 | NONE |

| OFFER IDENTIFIER 402 | BUYER IDENTIFIER 404 | PRODUCT CATEGORY 406 | OFFER AMOUNT 408 | NUMBER OF TOKENS OFFERED 410 | STATUS 412 |
|---|---|---|---|---|---|
| O651 | B101 | LARGE ORANGE JUICE | $1.50 | 1 | ACCEPTED |
| O652 | B102 | LARGE ORANGE JUICE | $1.00 | 2 | PENDING |
| O653 | B101 | MEDIUM SCREEN TELEVISION | $390.00 | 1 | PENDING |
| O654 | B103 | MEDIUM SCREEN TELEVISION | $375.00 | 0 | NOT ACCEPTED |

| PRODUCT IDENTIFIER 502 | PRODUCT CATEGORY 504 | PRODUCT DESCRIPTION 506 | MINIMUM ACCEPTABLE PRICE 508 | AVERAGE RETAIL PRICE 510 | COST 512 |
|---|---|---|---|---|---|
| P1001 | ORANGE JUICE | 64 OZ MINUTE MAID® | $2.50 | $3.75 | $2.00 |
| P1002 | ORANGE JUICE | 64 OZ TROPICANA® | $2.75 | $4.00 | $2.25 |
| P5001 | TELEVISION | 32 INCH SCREEN SONY® WITH PICTURE-IN-PICTURE | $400.00 | $450.00 | $375.00 |
| P5002 | TELEVISION | 27 INCH SCREEN PANASONIC® WITH REMOTE CONTROL | $400.00 | $450.00 | $350.00 |

| TRANSACTION IDENTIFIER 602 | OFFER IDENTIFIER 604 | PRODUCT IDENTIFIER 606 | MAXIMUM VALUE PER TOKEN 608 | TRANSACTION VALUE PER TOKEN 610 | RETAIL VALUE PER TOKEN 612 |
|---|---|---|---|---|---|
| T10001 | O648 | P5002 | $2.20 | $2.00 | $1.95 |
| T10002 | O649 | P2001 | NO TOKEN REDEEMED | NO TOKEN REDEEMED | NO TOKEN REDEEMED |
| T10003 | O650 | P3001 | $1.65 | $0.00 | $0.00 |
| T10004 | O651 | P1001 | $1.10 | $1.00 | $1.25 |

SYSTEMS AND METHODS USING A REPRESENTATION OF A STORED BENEFIT TO FACILITATE A TRANSACTION

CROSS REFERENCE TO RELATED APPLICATIONS

The present application is related to: U.S. patent application Ser. No. 09/337,906 entitled "Purchasing Systems and Methods Wherein a Buyer Takes Possession at a Retailer of a Product Purchased Using a Communication Network," and filed Jun. 22, 1999, which is a continuation-in-part of U.S. patent application Ser. No. 08/889,503 entitled "System and Process for Local Acquisition of Products Priced Online" and filed Jul. 8, 1997; U.S. patent application Ser. No. 09/219,267 entitled "Method and Apparatus for Facilitating Electronic Commerce Through Providing Cross-Benefits During a Transaction" and filed Dec. 23, 1998; U.S. patent application Ser. No. 09/282,747 entitled "Method and Apparatus for Providing Cross-Benefits Based on a Customer Activity" and filed Mar. 31, 1999; U.S. patent application Ser. No. 09/274,281 entitled "Method and Apparatus for Providing Cross-Benefits via a Central Authority" and filed Mar. 22, 1999; U.S. patent application Ser. No. 09/322,351 entitled "Method and Apparatus for Providing Cross Benefits and Penalties" and filed May 28, 1999; U.S. patent application Ser. No. 08/943,483 entitled "System and Method for Facilitating Acceptance of Conditional Purchase Offers (CPOs)" and filed on Oct. 3, 1997, which is a continuation-in-part of U.S. patent application Ser. No. 08/923,683 entitled "Conditional Purchase Offer (CPO) Management System For Packages" and filed Sep. 4, 1997, which is a continuation-in-part of U.S. patent application Ser. No. 08/889,319 entitled "Conditional Purchase Offer Management System" and filed Jul. 8, 1997, which is a continuation-in-part of U.S. patent application Ser. No. 08/707,660 entitled "Method and Apparatus for a Cryptographically Assisted Commercial Network System Designed to Facilitate Buyer-Driven Conditional Purchase Offers" filed on Sep. 4, 1996 and issued as U.S. Pat. No. 5,794,207 on August 11, 1998. The entire contents of these application are incorporated herein by reference.

FIELD

The present invention relates to commerce. In particular, the present invention relates to systems and methods using a representation of a stored benefit to facilitate a transaction.

BACKGROUND

Typically, a buyer visits one or more retail stores to shop for a product. When the buyer finds the product he or she is looking for, at a reasonable price, the buyer purchases the product from the retail store. This traditional method, however, may require that the buyer visit a number of retail stores to determine a reasonable price for the product. Moreover, a retail store must attract buyers, such as by spending money on advertising. For example, when a new retail store opens for business, many buyers will not know what types of products are sold by the retail store. In addition, the traditional method does not let a party other than the retail store, such as a product manufacturer, establish a pricing relationship directly with a buyer. For example, a manufacturer may sell a product to a retail store (perhaps through a distributor) that ultimately determines the price at which the product is sold to a buyer.

Recently, products have been sold to buyers via communication networks such as the Internet (e.g., via an online Web merchant). Internet sales have been growing steadily over the past few years, and are expected to increase, because buyers are attracted to the ease and convenience of shopping online. For example, a buyer can shop online from the comfort of home and receive information from a number of Web merchants to determine a reasonable price for a product.

The sale of products from Web merchants to buyers, however, has a number of disadvantages. For example, in a typical sale via the Internet, a traditional retail store (e.g., a retail store which is not online) is typically left completely out of the transaction. In addition to losing a potential profit from the sale of the product itself, such a retail store loses the chance to sell additional products to the buyer, such as product accessories (e g., batteries). Moreover, the retail store cannot sell unrelated products that attract the buyer's attention while he or she is in the store. This may still be a problem even if the retail store invested the time and money required to establish an online service. Moreover, a retail store's online service may simply shift sales that would have otherwise occurred at the actual store (as opposed to attracting new buyers).

U.S. patent application Ser. No. 09/337,906 filed Jun. 22, 1999 and entitled "Purchasing Systems and Methods Wherein a Buyer Takes Possession at a Retailer of a Product Purchased Using a Communication Network" describes systems wherein a buyer takes possession of a product at a retailer. The purchasing system communicates with a buyer through a communication network to establish a first price for a product between the buyer and a seller. For example, the purchasing system may evaluate a buyer offer, including an offer price, related to the product. If the buyer offer is acceptable, the purchasing system arranges for the buyer to take possession of the product at a retailer, different from the seller, that offers the product for sale at a second price. The buyer provides a payment, based on the first price, to the purchasing system in exchange for the right to take possession of the product at the retailer.

No matter what type of system is used to sell a product, some buyers may not be willing, or able, to pay an acceptable price for the product (e.g., a merchant's retail price). One way to address this problem is to reduce the acceptable price associated with the product. Unfortunately, reducing the acceptable price also reduces any profit from the sale of the product, and the reduced profit may not be offset by any increase in the number products that are sold.

Instead of simply reducing the acceptable price, a merchant (or manufacturer) may distribute coupons that discount the price associated with the product. This also reduces any profit with respect to those transactions in which a coupon is redeemed. Moreover, the discount associated with a coupon is traditionally revealed to buyers, preventing the discount from being adjusted as appropriate (e.g., by increasing the discount if the coupon is not generating sales or by adjusting the discount based on information associated with a particular buyer). In addition, the value of a coupon is generally determined when the coupon is provided to a buyer, and not when the buyer redeems the coupon. This also prevents the discount from being adjusted as may be appropriate (e.g., based on supply, demand or any other information at the time of redemption).

Another way to reduce the price associated with a product is through the use of a bonus point program. U.S. Pat. No. 5,937,391 to Ikeda et al. discloses one such bonus point system for use in online transactions. As with traditional coupons, however, the value of each bonus point is disclosed to buyers, limiting the ability of the system to effectively adjust the value. For example, a buyer may become dissatisfied when the value of his or her bonus points is reduced. Moreover, the value cannot be adjusted based on information associated with a buyer (e.g., the value cannot be increased when a buyer indicates that he or she is interested in a product made by any of a number of different manufacturers).

Instead of reducing the price associated with a product, it is also known that a merchant can offer a promotion to encourage a buyer to purchase a product. For example, a merchant may advertise a "buy one get one free" promotion or a provide a discount if to buyers who establish a credit card account associated with the merchant. Similarly, a number of merchants can work together to offer a promotion. For example, a first merchant may advertise that if a buyer purchases a first product from the first merchant, a second product can be purchased at a reduced price from, or be given away by, a second merchant.

U.S. patent application Ser. No. 09/219,267 filed Dec. 23, 1998 and entitled "Method and Apparatus for Facilitating Electronic Commerce Through Providing Cross-Benefits During a Transaction" describes systems wherein a merchant server of a first merchant receives an indication of products that a buyer is to purchase via a Web site. In response, the merchant server provides an offer for a benefit from a second merchant, such as by providing a cross-benefit or subsidy offer. If the buyer indicates acceptance of the subsidy offer, the benefit is applied to the product or products being purchased. In exchange, the buyer agrees to participate in a transaction with the second merchant. The buyer, however, does not earn and store the right to such a benefit before indicating, a product he or she is to purchase. Moreover, the value of the benefit may be revealed to the buyer, limiting the ability of the system to adjust the value (e.g., after the benefit is earned) to increase its effectiveness.

SUMMARY

To alleviate problems inherent in the prior art, the present invention introduces systems and methods using a representation of a stored benefit to facilitate a transaction.

According to one embodiment of the present invention, offer information, including an offer amount, is received from a buyer. An indication that the buyer is willing to redeem a stored benefit associated with the buyer is also received. A value associated with the stored benefit is determined, and the offer information is evaluated based on the offer amount, the value associated with the stored benefit, and an amount associated with a product.

According to another embodiment, offer information, including a product category, is received from a buyer. An indication that the buyer is willing to redeem a stored benefit associated with the buyer is also received. A product is selected based on the product category, and the offer information is evaluated based on at least one of an amount associated with the offer, an amount associated with the stored benefit, and an amount associated with the product.

According to another embodiment, offer information, including an offer amount, is received from a buyer. The offer information is evaluated to determine that the offer information is not acceptable based on the offer amount. An indication that the buyer is willing to redeem a stored benefit associated with the buyer is received, and the offer information is re-evaluated to determine that the offer information is acceptable based on the stored benefit.

According to another embodiment, it is arranged for a buyer to perform a task, and a stored benefit is associated with the buyer based on the performance of the task. An indication that the buyer is willing to redeem the stored benefit is received, and it is arranged for the buyer to purchase a product in accordance with a benefit associated with the stored benefit.

According to another embodiment of the present invention, it is arranged for a buyer to perform a task, and a stored benefit is associated with the buyer based on the performance of the task. An offer to purchase a product is received from a buyer. An indication that the buyer is willing to redeem the stored benefit is also received, and a probability that the offer from the buyer will be accepted is determined based on at least one of an amount associated with the offer, an amount associated with the stored benefit, and an amount associated with the product.

One embodiment of the present invention comprises: means for receiving offer information, including an offer amount, from a buyer; means for receiving an indication that the buyer is willing to redeem a stored benefit associated with the buyer; means for determining a value associated with the stored benefit; and means for evaluating the offer information based on the offer amount, the value associated with the stored benefit, and an amount associated with a product.

With these and other advantages and features of the invention that will become hereinafter apparent, the nature of the invention may be more clearly understood by reference to the following detailed description of the invention, the appended claims and the several drawings attached herein.

BRIEF DESCRIPTION OF THE DRAWINGS

FIG. 3 is a tabular representation of a portion of a buyer database according to an embodiment of the present invention.

FIG. 4 is a tabular representation of a portion of an offer database according to an embodiment of the present invention.

FIG. 5 is a tabular representation of a portion of a product database according to an embodiment of the present invention.

FIG. 6 is a tabular representation of a portion of a transaction database according to an embodiment of the present invention.

DETAILED DESCRIPTION

The present invention is directed to systems and methods using a representation of a stored benefit to facilitate a transaction. For example, according to an embodiment of the present invention, a buyer may transmit offer information, including an offer amount, to a controller. The buyer may also transmit an indication that he or she is willing to redeem one or more "tokens." A token may be, for example, any information or symbol representing a buyer's right to receive a benefit, such as a reduced price. The controller determines a value associated with the token and evaluates the offer information based on (i.e., based at least in part on) the offer amount, the value associated with the token, and an amount associated with a product. If it is determined that the offer information is acceptable, the controller arranges for the buyer to purchase the product in exchange for payment of an amount based on the offer amount.

Figure 1:
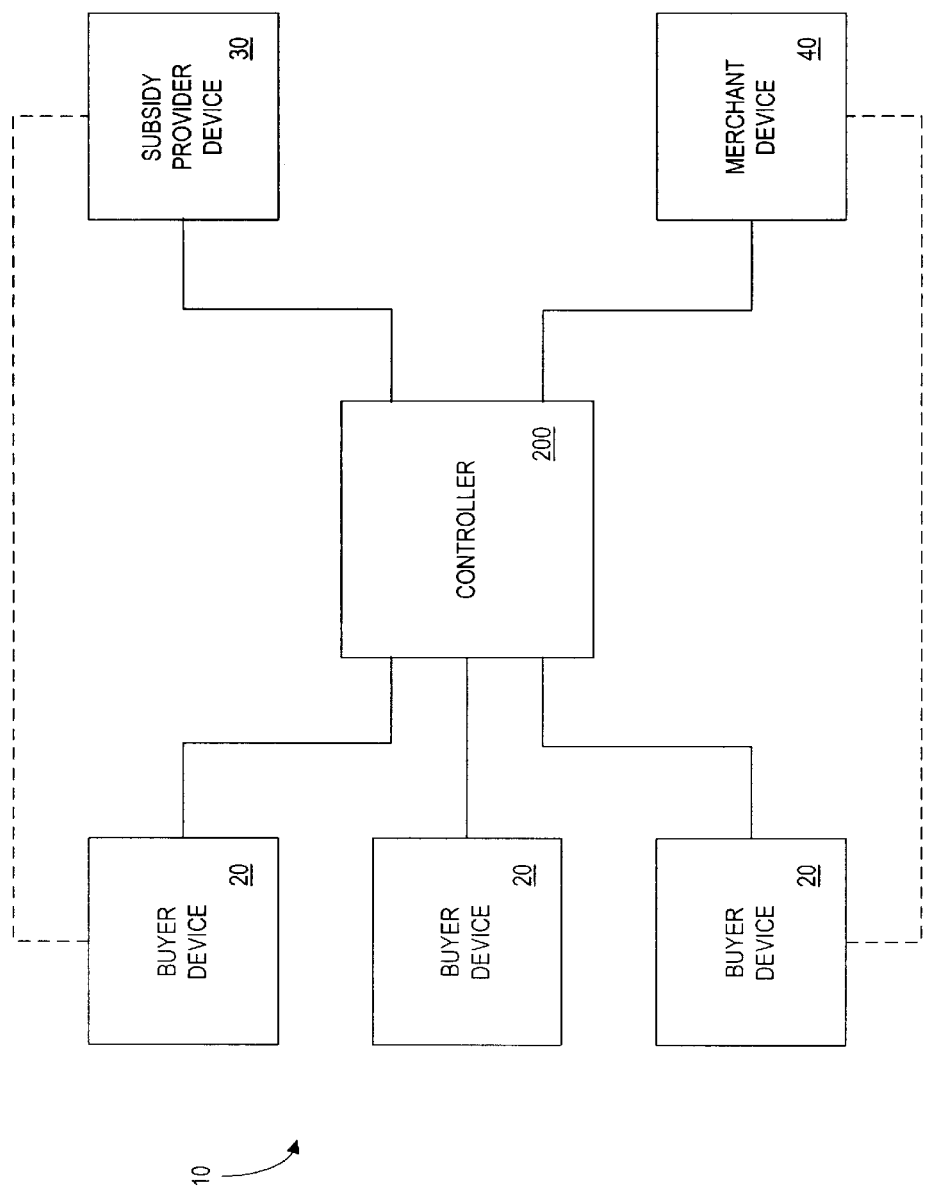
FIG. 1 is a block diagram overview of a transaction system according to an embodiment of the present invention.

Turning now in detail to the drawings, FIG. 1 is a block diagram overview of a transaction system 10 according to one embodiment of the present invention. The transaction system 10 includes a controller 200 in communication with a number of buyer devices 20. As used herein, a device (including the controller 200, the buyer devices 20, a subsidy provider device 30, and/or a merchant device 40) may communicate, for example, through a communication network such as a Local Area Network (LAN), a Wide Area Network (WAN), a Metropolitan Area Network (MAN), a Public Switched Telephone Network (PSTN), or an Internet Protocol (IP) network such as the Internet, an intranet or an extranet. Moreover, as used herein, a communication network includes those enabled by wired or wireless technology.

In one embodiment of the present invention, the buyer devices 20 communicate with a remote Web-based controller 200 (e.g., a server) via the Internet. Although embodiments of the present invention will be described with respect to information exchanged using a Web site, according to other embodiments of the present invention information can be exchanged using, for example, a wired or wireless telephone, an Interactive Voice Response Unit (IVRU), a facsimile machine, regular mail, electronic mail, a WEBTV® interface, a cable network interface, and/or a wireless device.

A buyer device 20 may be, for example, a Personal Computer (PC), a portable computing device such as a Personal Digital Assistant (PDA), a wired or wireless telephone, a one-way or two-way pager, a kiosk, an Automated Teller Machine (ATM), and/or any other appropriate communication device. Note that the buyer devices 20 may include a number of different types of devices (e.g., some buyers may use PCs while others use telephones).

As will be explained, the transaction system 10 may be used to facilitate a transaction in which a buyer purchases a product. As used herein, the "product" may be anything that can be purchased by a buyer (e.g., a good, a service, or an interest in a good or a service). For example, the product could be a grocery item, a book, a consumer electronics device, or a movie or airline ticket.

According to one embodiment of the present invention, the controller 200 arranges for a buyer to perform a task, such as a task associated with a subsidy provider. The task may comprise, for example, the buyer applying for a new credit card. In this case, a credit card company may provide, for example, a payment of $20.00 to the controller 200 in exchange for a new potential customer.

Based on the buyer's performance of the task, the controller 200 associates a stored benefit with the buyer, such as by storing a representation of a "token" in a buyer database located at the controller 200. For example, the controller may add ten tokens to a number of available tokens associated with the buyer. According to one embodiment, the controller 200 offers to provide a buyer with such a stored benefit when the buyer indicates an interest in purchasing a product (e.g., when the buyer places the product into his or her virtual shopping cart). In this case, the buyer may perform the task immediately (e.g., through the controller 200 or by communicating directly with a subsidy provider device 30), or may promise to perform the task in the future. Note that if the buyer does not perform the task as he or she promised, a penalty may be applied to the buyer (e.g., using a credit card number associated with the buyer).

According to another embodiment, the controller 200 stores the representation of the token at the buyer device 20. For example, the controller 200 may store a token code on the buyer's PDA. The token code may be, for example, a verifiable "hash" value generated when buyer information is used with a hash function, such as a one-way hash function. A hash function is a transformation that takes input information and returns a hash value. In general, one can think of a hash value as a "digital fingerprint" of the input information. For example, the input information to the hash function may be the buyer's name and address and information about a task (e.g., a task identifier). In this case, the hash function would generate the token code based on the input information. The controller 200 could then validate the token code using another function. Applicable hash functions and other encryption techniques are described in Bruce Schneier, "Applied Cryptography: Protocols, Algorithms, and Source Code in C" (John Wiley & Sons, Inc., 2nd Ed. 1996).

As another example, the controller 200 may store the representation of the token using the buyer's PC, such as by storing the representation as a "cookie." A cookie may be a block of data that a Web server (e.g., the controller 200) stores on a client system (e.g., the buyer device 20). When a buyer returns to the same Web site, or an associated Web site, the browser of the buyer device 20 sends a copy of the cookie back to the Web server. Cookies may be used to identify buyers associated with the buyer device 20, to instruct the Web server to send a customized version of a Web page, to submit stored benefits associated with the buyer, and for other purposes.

After earning his or her tokens, the buyer may transmit offer information from the buyer device 20 to the controller 200. The offer information may include, for example, a product category and an offer amount. By way of example, the buyer may offer to pay $4.00 (i.e., the offer amount) in exchange for the right to pick up a sixteen inch pizza (i.e., the product category) from any of a number of local restaurants.

According to an embodiment of the present invention, the buyer also transmits an indication that he or she is willing to redeem one or more tokens. The indication may be included in the offer information transmitted from the buyer device 20 to the controller 200. For example, the buyer may offer to pay $4.00 and redeem two tokens (e.g., two of the ten tokens the buyer earned by applying for a new credit card) in exchange for the right to pick up a sixteen inch pizza.

The controller 200 may then verify that the token is associated with the buyer. For example, when the buyer has indicated that he or she is willing to redeem two tokens, the controller 200 may retrieve a number of available tokens associated with the buyer to verify that he or she does in fact have at least two tokens.

The controller 200 may then determine a value associated with the token or tokens.

For example, the controller 200 may retrieve a stored value indicating that all tokens are currently worth $2.00. Note that according to an embodiment of the present invention, the value of the token may be determined without being revealed to the buyer. Also note that, according to one embodiment, the value associated with tokens may be modified by the controller 200. For example, the controller 200 may increase the value associated with tokens in order to increase the rate at which buyer offers are being accepted. Consider a controller 200 that currently associates a value of $0.50 with each token. If a large number of buyer offers are currently not being accepted (e.g., 85% are not accepted), the controller 200 may increase the value to $0.65. As a result of this increase, the value of a buyer offer (adjusted based on the number of tokens the buyer is willing to redeem) will increase and the number of buyer offers that are not being accepted may decrease (e.g., 45% are not accepted).

According to another embodiment, the controller 200 may adjust a value associated with each token based on information associated with a number of prior transactions. Consider a controller 200 that currently associates a value of $10 with each token. A review of prior transactions in which buyers redeemed one or more tokens (e.g., a review of such transactions that occurred during the past week), however, reveals that the controller 200 is paying retail stores an average of $12 extra for each token that is being redeemed. In this case, the controller 200 may adjust the value associated with each token to $12 to reflect the actual cost of each token to the controller 200.

According to an embodiment of the present invention, the value associated with the token or tokens is then added to the offer amount to determine an adjusted offer amount. For example, if the buyer offered to pay $4.00 and redeem two tokens, each worth $2.00, the adjusted offer amount may be $8.00 ($4.00+[$2.00×2]).

The controller 200 may also select a particular product from a plurality of products based on the product category. For example, the controller 200 may select a sixteen inch PIZZA HUT® pizza if the buyer has offered to purchase a sixteen inch pizza.

The adjusted offer amount may then be compared to an amount a merchant will accept in exchange for providing the selected product to the buyer. The amount a merchant will accept may be based on, for example, a minimum acceptable price established by a manufacturer, an average retail price, or information received from another source, such as the merchant device 40 (including information received in response to a request from the controller 200). The amount may also have been previously agreed to by the controller 200 and the merchant. Note that the adjusted offer amount may be acceptable to the controller 200 even if it is less than the amount the merchant will accept (e.g., the controller 200 may lose money on the transaction or may receive funds from another source, such as a product manufacturer).

If the adjusted offer amount is not acceptable (e.g., the adjusted offer amount is less than a minimum acceptable price), the controller 200 may suggest, for example, that the buyer increase the amount he or she is willing to pay or the number of tokens he or she is willing to redeem.

If the adjusted offer amount is acceptable, the controller 200 may arrange for the buyer to purchase the product. For example, suppose that a PIZZA HUT® restaurant owner in a particular town has previously agreed to provide sixteen inch pizzas in exchange for payment of $7.00. Because the adjusted offer amount of $8.00 is at least equal to the amount that the restaurant owner will accept, the controller 200 may arrange for the buyer to purchase the product in exchange for payment of an amount based on the offer amount. For example, the buyer may provide the $4.00 to the controller 200, and the controller 200 may provide $7.00 to the restaurant owner in exchange for providing the pizza to the buyer. Note that a payment the controller 200 previously received from a subsidy provider (e.g., a payment received when a buyer performed a task to earn a token), may still make the transaction profitable for the controller 200.

The controller 200 may then record that the buyer has redeemed one or more tokens. For example, the controller 200 may subtract two tokens from a number of available tokens associated with the buyer.

In addition to communicating with the controller 200, a buyer device 20 may communicate directly with, for example, the subsidy provider device 30 or the merchant device 40 (shown as dashed lines in FIG. 1). For example, a buyer may visit a Web site associated with a subsidy provider to earn tokens and/or may redeem tokens directly via a merchant's Point Of Sale (POS) terminal.

Controller

Figure 2:
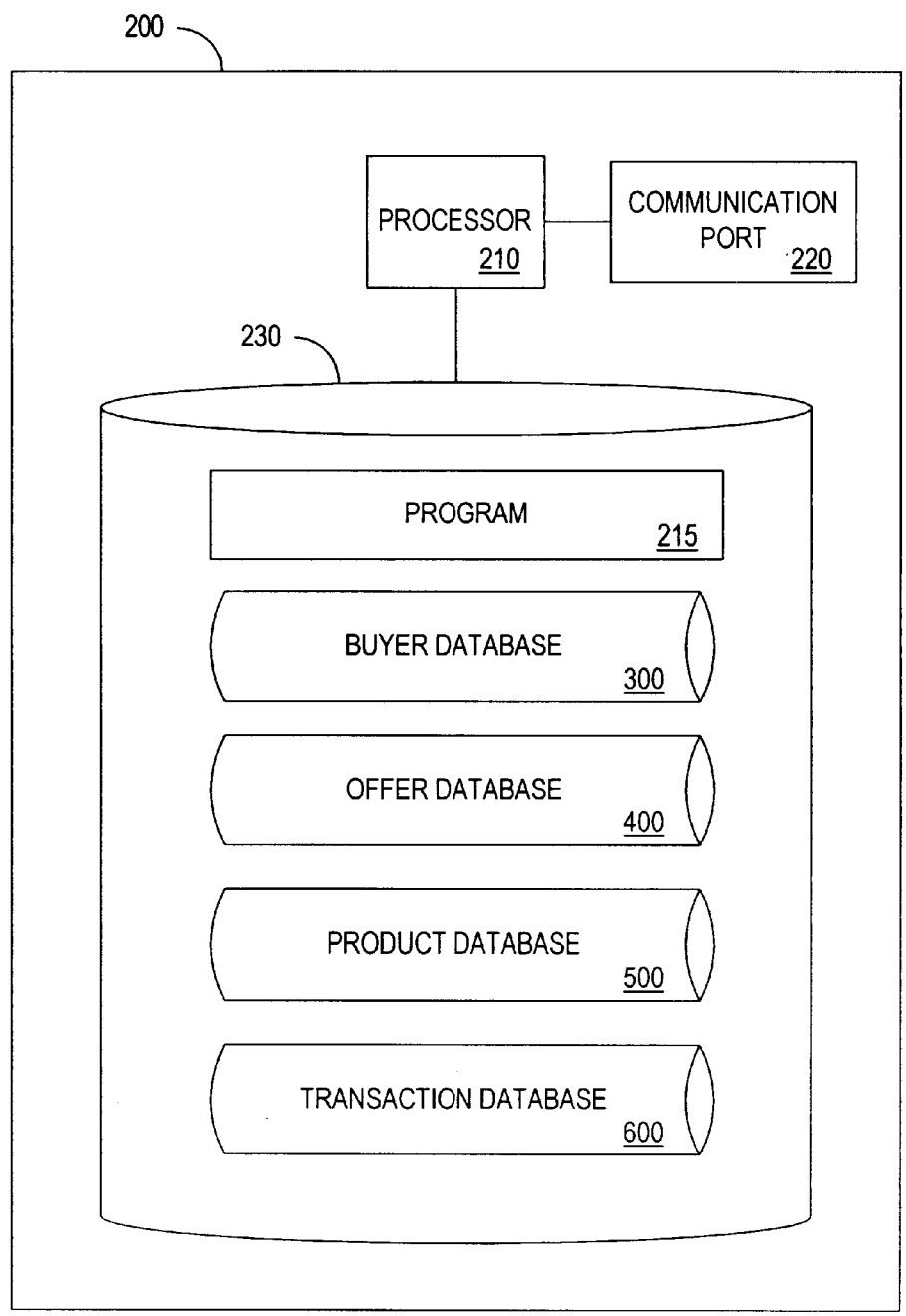
FIG. 2 is a block diagram of a controller according to an embodiment of the present invention.

FIG. 2 illustrates a controller 200 that is descriptive of the device shown in FIG. 1 according to one embodiment of the present invention. The controller 200 comprises a processor 210, such as one or more INTEL® Pentium®processors, coupled to a communication port 220 configured to communicate through a communication network (not shown in FIG. 2). Note that the controller 200 may comprise a single computer, a network, or any other device capable of performing the functions described herein. The communication port 220 may be used to communicate, for example, with one or more buyer devices 20, subsidy provider devices 30, and/or merchant devices 40.

The processor 210 is also in communication with a storage device 230. The storage device 230 may comprise any appropriate storage device, including combinations of magnetic storage devices (e.g., magnetic tape and hard disk drives), optical storage devices and semiconductor memory devices, such as Random Access Memory (RAM) devices and Read Only Memory (ROM) devices.

The storage device 230 stores a program 215 for controlling the processor 210. The processor 210 performs instructions of the program 215, and thereby operates in accordance with the present invention. For example, the processor 210 may receive offer information from a buyer along with an indication that the buyer is willing to redeem a stored benefit (e.g., a token), determine a value associated with the stored benefit, and evaluate the offer information.

The program 215 may be stored in a compressed, uncompiled and/or encrypted format. The program 215 furthermore includes program elements that may be necessary, such as an operating system, a database management system, and "device drivers" used by the processor 210 to interface with peripheral devices. Appropriate program elements are known to those skilled in the art.

Note that the processor 210 and the storage device 230 may be, for example, located entirely within a single computer or other computing device or located in separate devices coupled through a communication channel. In one embodiment, the controller 200 comprises one or more computers that are connected to a remote database server.

As used herein, information may be "received" by, for example, (i) the controller 200 from a buyer device 20, or (ii) a software application or module within the controller 200 from another software application, module or any other source.

As shown in FIG. 2, the storage device 230 also stores a buyer database 300 (described with respect to FIG. 3), an offer database 400 (described with respect to FIG. 4), a product database 500 (described with respect to FIG. 5), and a transaction database 600 (described with respect to FIG. 6). Examples of databases that may be used in connection with the transaction system 10 will now be described in detail with respect to FIGS. 3 to 6. Each figure depicts a database in which the data is organized according to a data structure in accordance with embodiments of the present invention. The data may be stored, for example, on a computer readable medium and be accessible by a program executed on a data processing system. The schematic illustrations and accompanying descriptions of the databases presented herein are exemplary, and any number of other database arrangements could be employed besides those suggested by the figures.

Buyer Database

Referring to FIG. 3, a table represents one embodiment of the buyer database 300 that may be stored at the controller 200 shown in FIGS. 1 and 2 according to an embodiment of the present invention. The table includes entries identifying buyers that may purchase products via the controller 200. The table also defines fields 302, 304, 306, 308, 310, 312 for each of the entries. The fields specify a buyer identifier 302, a name 304, a mailing address 306, an electronic mail address 308, a payment identifier 310, and a number of available tokens 312.

The buyer identifier 302 may be, for example, an alphanumeric code associated with a buyer who may purchase a product via the controller 200. The buyer identifier 302 may be, for example, generated by the controller 200 when a buyer registers to use the controller 200 or may be created by the buyer (e.g., when the buyer creates a user name and password).

The name 304, mailing address 306, and electronic mail address 308 may represent the buyer's name, mailing address and electronic mail address, respectively, and may be based on information received from the buyer device 20 when the buyer registers to use the controller 200 or when the buyer submits offer information. The electronic mail address 308 may be used, for example, to communicate with a buyer device 20 when offer information is evaluated by the controller 200 (e.g., to arrange for the buyer to purchase a product or to advise the buyer that one or more additional tokens should be redeemed).

The payment identifier 310 may be, for example, a credit card number, a debit card number, a checking account number, or digital payment protocol information that can be used to receive payment from the buyer (e.g., to receive payment of an offer amount in exchange for a product). The payment identifier 310 may be based on, for example, information received from the buyer device 20 when the buyer registers to use the controller 200 or when the buyer submits offer information.

The number of available tokens 312 represents a number of tokens that are currently associated with the buyer (e.g., the number of tokens that have been earned by, and may be redeemed by, the buyer). The number of available tokens 312 may be updated, for example, when the buyer performs a task or when the buyer redeems one or more tokens during a transaction. Note that, according to other embodiment of the present invention, the controller 200 may associate different types of tokens with buyers (e.g., gold tokens representing a 20% increase to an offer amount and silver tokens representing a 10% increase to an offer amount). According to another embodiment, specific token codes may be stored in the buyer database 300. In this way, different tokens can be associated with different values. For example, a particular value may be associated with a particular token at the time the token is associated with a buyer. According to other embodiments, other information can also be associated with a token. For example, an expiration date or another redemption requirement may be associated with a token (e.g., a token may only be used to purchase a movie ticket or a NIKON® camera).

Offer Database

Referring to FIG. 4, a table represents one embodiment of the offer database 400 that may be stored at the controller 200 shown in FIGS. 1 and 2 according to an embodiment of the present invention. The table includes entries identifying offers received from buyers. The table also defines fields 402, 404, 406, 408, 410, 412 for each of the entries. The fields specify an offer identifier 402, a buyer identifier 404, a product category 406, an offer amount 408, a number of tokens offered 410, and a status 412.

The offer identifier 402 may be, for example, an alphanumeric code associated with an offer received from a buyer. The buyer identifier 404 may be, for example, an alphanumeric code associated with the buyer who submitted the offer and may be based on the buyer identifier 302 stored in the buyer database 300.

The product category 406 may represent the type of product that the buyer is offering to purchase. For example, the buyer may be offering to purchase any medium screen television. Note that other information can be received from the buyer in addition to, or in place of, the product category 406. For example, the buyer may indicate a specific product identifier, a product manufacturer or a product brand (e.g., a buyer may offer to purchase a 27 inch screen SONY® television). Similarly, a buyer may indicate a product description, a product quantity (e.g., five cans of tuna fish), a product class (e.g., a personal computer manufactured by COMPAQ®, DELL® or GATEWAY®), at least one product feature (e.g., an automobile with automatic transmission), an accessory associated with the product (e.g., a video camera tripod), an age associated with the product (e.g., a used exercise bicycle no more than five years old), a product condition (e.g., poor, fair, or good), a product preference (e.g., the buyer prefers to purchase his or her product from a small business), an offer period (e.g., the offer expires in seven days), delivery information (e.g., shipping charges must not exceed $10.00), and payment information (e.g., purchase must be on credit with no payments for three months).

The offer amount 408 represents a payment the buyer offers to provide in exchange for a product. Similarly, the number of tokens offered 410 represents a number of tokens (of the number of available tokens 312 stored in the buyer database 300) that the buyer is willing to redeem. According to another embodiment of the present invention, the offer information received from a buyer device 20 may comprise particular token codes (e.g., a list of hash values) instead of a number of tokens offered 410. According to another embodiment, the offer amount 408 and/or number of tokens offered 410 may be selected by the buyer from a list of suggested values.

The status 412 represents the status of the offer. For example, the status 412 may be "accepted," in which case the controller 200 may arrange for the buyer to purchase a product. If the status 412 is "not accepted," the controller 200 may recommend that the buyer increase his or her offer amount and/or redeem one or more additional tokens. According to one embodiment of the present invention, the status 412 may also be "pending," such as when the controller 200 has transmitted a request to one or more merchant devices 40 (or any other party, such as a product manufacturer) to determine if the buyer's offer is acceptable.

Product Database

Referring to FIG. 5, a table represents one embodiment of the product database 500 that may be stored at the controller 200 shown in FIGS. 1 and 2 according to an embodiment of the present invention. The table includes entries identifying products that a buyer may purchase. The table also defines fields 502, 504, 506, 508, 510, 512 for cacti of the entries. The fields specify a product identifier 502, a product category 504, a product description 506, a minimum acceptable price 508, an average retail price 510, and a cost 512. The information in the product database 500 may based on, for example, information received from one or more merchant devices 40.

The product identifier 502 may be, for example, an alphanumeric code associated with a product that a buyer may purchase. The product category 504 may represent a type of product that a buyer may offer to purchase and may be based on the product category 406 stored in the offer database 400. The product description 506 describes a particular product, such as a particular brand of product.

The minimum acceptable price 508 represents an amount below which a buyer's offer (e.g., the buyer's offer amount 408 increased by the total value associated with the number of tokens offered 410) will not be accepted. The average retail price 510 represents the price at which merchants typically sell the product to buyers. According to one embodiment of the present invention, the controller 200 provides payment to a merchant of an amount based on the retail price in exchange for the merchant providing the product to a buyer. In this case, the product database 500 may store the actual retail price associated with each merchant instead of, or in addition to, the average retail price 508.

The cost 512 associated with a product may be used, for example, to determine the profit to the controller 200, a merchant, or a manufacturer when a buyer purchases the product (e.g., by subtracting the buyer's offer amount 408, adjusted based on the number of tokens offered 410, from the cost 512). For example, as shown in FIG. 5, the product having a product identifier 502 of "P5001" has a cost 512 (e.g., a cost of manufacturing the television) of $375, and the product having a product identifier 502 of "P5002" has a cost 512 of $350. In this case, a buyer who offers to pay $410 to purchase a television from a manufacturer may be provided with "P5002" (e.g., because the manufacturer of "P5001" would make a profit of $35 while the manufacturer of "P5002" would make a profit of $60 on such a transaction). Note that if the buyer was willing to redeem three tokens, each worth $10, and those tokens could only be redeemed with the manufacturer of "P5001," the result may be different (e.g., because the manufacturer of "P5001" would now make a profit of $65 while the manufacturer of "P5002" would still make a profit of $60).

Transaction Database

Referring to FIG. 6, a table represents one embodiment of the transaction database 600 that may be stored at the controller 200 shown in FIGS. 1 and 2 according to an embodiment of the present invention. The table includes entries identifying a transaction in which a buyer has purchased a product. The table also defines fields 602, 604, 606, 608, 610, 612 for each of the entries. The fields specify a transaction identifier 602, an offer identifier 604, a product identifier 606, a maximum value per token 608, a transaction value per token 610, and a retail value per token 612.

The transaction identifier 602 may be, for example, an alphanumeric code associated with a particular transaction. The offer identifier 604 may be, for example, an alphanumeric code associated with an offer that has been accepted and may be based on the offer identifier 402 stored in the offer database 400. The product identifier 606 may be, for example, an alphanumeric code associated with the particular product that was provided to the buyer in the transaction (e.g., the particular product selected by the controller 200 based on the product category 408 received from the buyer) and may be based on the product identifier 502 stored in the product database 500.

The maximum value per token 608, transaction value per token 610, and retail value per token 612 represent various amounts that the controller 200 determined were associated with each of the number of tokens offered 410 by (and redeemed by) the buyer during the transaction.

For example, the maximum value per token 608 may represent the largest monetary amount that the controller 200 will associate with a token (e.g., a token may be worth no more than $2.20). The maximum value per token 608 may be based on, for example, average subsidy amounts received by the controller 200 from subsidy providers. Also note that the controller 200 may adjust the maximum value per token 608. For example, the controller 200 may increase the maximum value per token 608 to increase the number of transactions that are completed via the transaction system 10.

The transaction value per token 610 may represent the actual value that the controller 200 determined was associated with a transaction. For example, if a buyer offers $1.50 and is willing to redeem two tokens for a product with a minimum acceptable price 508 of $2.50, the transaction value per token 610 may be $0.50. That is, because the transaction value of all of the redeemed tokens equals $1.00 (i.e., the minimum acceptable price of $2.50 less the buyer's offer of $1.50), the transaction value of each of the two tokens is $0.50.

In the case where a buyer takes possession of a product from a merchant, and the controller 200 provides a payment of a retail price to the merchant in exchange for providing the product to the buyer, the retail value per token 612 may be different than the transaction value per token 610. For example, as described above, if a buyer offered $1.50 and was willing to redeem two tokens for a product with a minimum acceptable price 508 of $2.50, the transaction value per token 610 may have been $0.50. If, however, the buyer takes possession of the product from a merchant which typically offers the product for sale at $2.60 (i.e., the retail price at that merchant is $2.60), the retail value per token 612 would actually be $0.55. Thus, the retail value per token 612 may be thought of a value that the customer will associated with a token. That is, because the retail price of $2.60 less the buyer's offer of $ 1.50 equals $ 1.10, the retail value of each of the two tokens is actually $(0.55 to the customer. To prevent the retail value per token 612 from exceeding the maximum value per token 608, the controller 200 may, if desired, set the minimum acceptable price 508 to the highest possible retail price associated with each product.

Methods that may be used in connection with the transaction system 10 according to an embodiment of the present invention will now be described in detail with respect to FIGS. 7 to 9B.

Transaction System Methods

Figure 7:
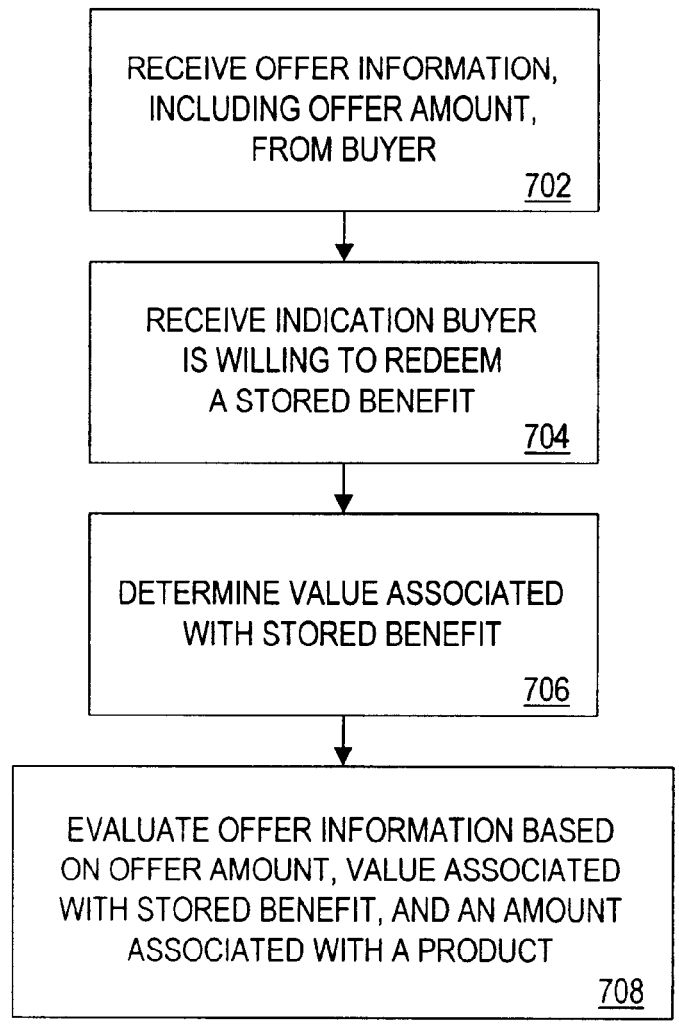
FIG. 7 is a flow chart of a transaction method according to an embodiment of the present invention.

FIG. 7 is a flow chart of a transaction method according to an embodiment of the present invention. The method shown in FIG. 7 may be performed, for example, by a controller 200 in response to offer information received from a buyer device 20. The flow chart in FIG. 7, as well as the other flow charts discussed herein, does not imply a fixed order to the steps, and embodiments of the present invention may be practiced in other orders.

At 702, offer information, including an offer amount, is received from a buyer. For example, a buyer may offer to purchase a two-liter bottle of cola for $0.50. The offer information may be received, for example, via a Web site, the Internet, a buyer computer, a PDA, a kiosk, an electronic mail message, a telephone, an interactive voice response unit, an operator, and/or a POS terminal.

According to one embodiment of the present invention, the buyer may independently determine and enter an offer amount via a buyer device 20, such as by entering the offer amount using a keyboard attached to his or her personal computer. According to another embodiment, the buyer may select the offer amount from a plurality of suggested offer amounts. For example, the controller 200 may transmit information to the buyer device 20 causing the buyer device 20 to display the following message "Please select a price for your offer to buy 16 oz. of coffee: (a) $2.17—fair chance of getting your price, (b) $2.03—low chance of getting your price." In this case, the buyer may select one of the suggested offer amounts (e.g., by clicking on "(b)" using his or her mouse).

The offer information may include other information in addition to, or instead of, the offer amount. For example, the offer information may indicate a product category (e.g., 16 oz. coffee). The offer information may also indicate one or more particular brands (e.g., the buyer is willing to purchase any of FOLGERS®, CHOCK FULL O'NUTS®), or MAX-WELL HOUSE®coffee).

At 704, an indication that the buyer is willing to redeem one or more stored benefits is received. The indication may be received, for example, as part of the offer information received at 702 or may be separately received by the controller 200. The indication may comprise, for example, a number indicating how many tokens the buyer is willing to redeem. According to another embodiment, the indication may comprise a token code received from the buyer device 20. According to still another embodiment, the indication may simply comprise a predetermined type of offer (e.g., the buyer selects to submit a "(c) best chance deal—$1.55 plus one token" type of offer). That is, either the buyer or the controller 200 could determine the number of tokens that are redeemed in a particular transaction.

According to one embodiment, the controller 200 verifies that the stored benefit is associated with the buyer (e.g., that the buyer has at least the number of tokens he or she is willing to redeem in the buyer database 300). Note that according to one embodiment, a stored benefit can be associated with a plurality of buyers. For example, stored benefits may be earned by and/or associated with a family or team of buyers.

At 706, a value associated with the stored benefit is determined. According to one embodiment, the value is determined without revealing the value to the buyer. For example, the controller 200 may, in response to receiving the indication at 704, determine that each stored benefit is worth at most $1.65 without transmitting that information to the buyer device 20. Note that, instead of being performed in response to the indication, the value of the stored benefit may be determined, for example, prior to receiving such an indication, such as when the value is determined when the buyer earns the stored benefit or when the controller 200 determines the value at periodic intervals (e.g., once a week).

According to one embodiment, the controller 200 determines the value associated with a stored benefit by retrieving a stored value. The stored value may be based on, for example, an amount of profit associated with the controller 200 and/or a number of transactions associated with the controller 200. That is, the controller 200 may adjust the value associated with stored benefits to, for example, increase profits or to increase the number of transactions that are completed. According to one embodiment of the present invention, the stored value is manually determined by an operator associated with the controller 200. According to another embodiment, the stored value is determined by another party, such as ai merchant or a subsidy provider.

The controller 200 may assign the same value to all stored benefits or may determine particular values associated with particular stored benefits (e.g., tokens earned by applying for a credit card may be worth less than tokens earned by purchasing a magazine subscription).

According to one embodiment, the value of the stored benefit is determined based on information associated with the buyer. For example, the value of the stored benefit may be based on a transaction history associated with the buyer, an address associated with the buyer, demographic information associated with the buyer, psychographic information associated with the buyer (e.g., information about attitudes, values, lifestyles and opinions), a credit rating associated with the buyer, and/or another offer associated with the buyer. For example, the value may be increased for new buyers to increase the likelihood that offers are accepted.

The value of the stored benefit may also be based on a product and/or a product category. For example, a token may be worth more when it is redeemed when purchasing computer software as compared to a music Compact Disc (CD).

At 708, the offer information is evaluated based on the offer amount, the value associated with the stored benefit, and an amount associated with a product. The value associated with the product may be based on, for example, the minimum acceptable price 508 associated with the product.

According to one embodiment, this evaluation comprises adding the value associated with the stored benefit to the offer amount to determine an adjusted offer amount. If the adjusted offer amount is at least equal to the amount associated with the product, the controller 200 arranges for the buyer to purchase the product.

According to another embodiment, the evaluation comprises determining a probability that the buyer's offer will be accepted based on the offer amount, the value associated with the stored benefit, and the amount associated with the product. For example, if a buyer does not redeem a token, the controller 200 may accept an offer amount of $5.00 for a particular product 80% of the time. In this case, each token redeemed by a buyer may increase the probability by 5% (i.e., if he or she redeems the tokens, the same offer amount of $5.00 may result in a 95% chance that the offer will be accepted).

According to other embodiments, the evaluation may also be based on, for example, another pending offer associated with the buyer and/or a number of stored benefits associated with the buyer. For example, a buyer associated with a large number of tokens may be less likely to have his or her offer accepted (e.g., because he or she may be more likely to redeem a larger number of tokens if an initial offer is not accepted).

According to one embodiment, if the evaluation results in a determination that the offer is not acceptable, the controller 200 may calculate a suggested number of tokens that the buyer add to his or her offer, and provide an indication of the suggested number of tokens to the buyer device 20. For example, the controller 200 may subtract the amount associated with the product from the offer amount to determine a difference and divide the difference by the amount associated with each token. Consider the case where each token currently has a value of $5.00. The controller 200 may determine that an offer of $50.00 and four tokens is not sufficient to purchase a portable stereo having a minimum acceptable price of $79.00 (e.g., because $50.00+[$5.00×4] is less than $79.00). As a result, the controller 200 may suggest that the buyer instead redeem six tokens (e.g., because $50.00+[$5.00×6] is at least $79.00). If the buyer does redeem six tokens, the controller 200 may keep the extra $1.00 as profit. According to another embodiment, the controller 200 may instead store an indication of the extra $1.00 in an account for later use with respect to that buyer or with respect to other buyers (e.g., the $1.00 may be applied to subsequent transactions). If the extra value is stored for later use with respect to that buyer, the controller 200 may or may not inform the buyer of the extra value. According to another embodiment, a payment associated with the extra value is simply provided to the buyer. Note that a suggested offer amount and/or a suggested number of tokens may be computed and provided to the buyer before the initial offer was received.

Figure 8:
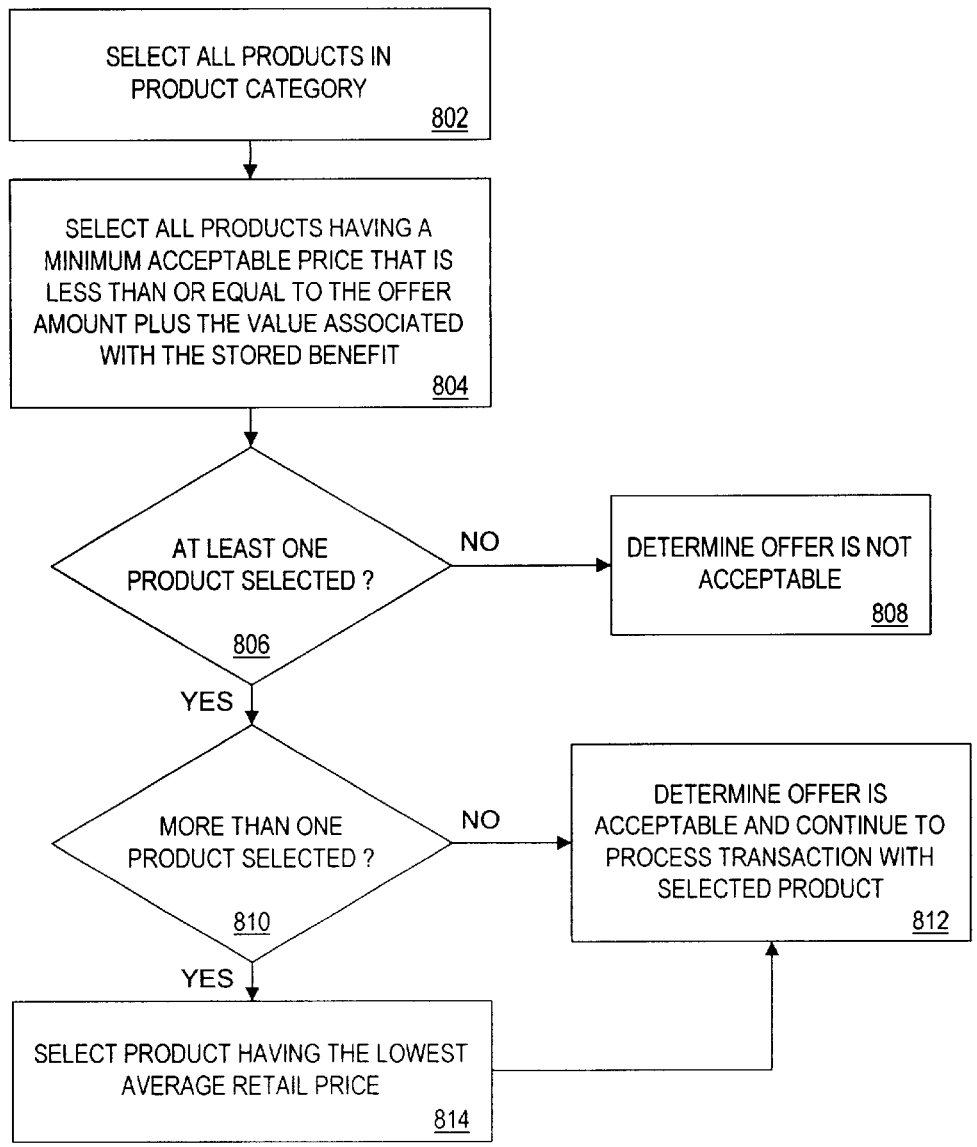
FIG. 8 is a flow chart of an evaluation method according to an embodiment of the present invention.

The evaluation of the offer information according to one embodiment of the present invention is described in greater detail with respect to FIG. 8. At 802, all products in the appropriate product category are selected. At 804, the controller 200 selects all products having a minimum acceptable price 508 that is less than or equal to the offer amount plus the value associated with the stored benefits the buyer is willing to redeem. If at least one product has not been selected at 806 (i.e., if no product has been selected), it is determined that the offer is not acceptable at 808.

If at least one product has been selected at 806, it is determined if more than one product has been selected at 810. If more than one product has not been selected at 810 (i.e., only a single product has been selected), it is determined that the offer is acceptable and the transaction continues with the selected product at 812.

If more than one product has been selected at 810, the controller 200 selects the product having the lowest average retail price 510 at 814. That is, assuming the controller 200 provides payment of the retail price to a merchant who allows a buyer to take possession of a product, selecting the product with the lowest average retail price will result in the highest profit for the controller 200. It is then determined that the offer is acceptable and the transaction continues with the selected product at 812.

Consider, for example, a buyer who offers to pay $0.50 and is willing to redeem one token in exchange for a can of tuna fish. Assume that a subsidy provider had previous provided payment of $1.10 to the controller 200 when the token was issued to the buyer Also assume that each token is currently worth $1.10 and that both BUMBLE BEE® and STARKIST® tuna fish have a minimum acceptable price less than $1.60 (i.e., less than $0.50+$1.10). If the controller 200 must, on average, pay supermarkets $1.45 for each can of BUMBLE BEE® tuna fish and $1.40 for each can of STARKIST® tuna fish, the controller 200 would make a profit of $0.15 if BUMBLE BEE® tuna is selected (i.e., $0.50+$1.10— $1.45) and $0.20 if STARKIST® tuna is selected (i.e., $0.50+$1.10 −$1.40). The controller therefore selects STARKIST® at 814. According other embodiments, the profit associated with another party (e.g., with buyers or merchants) may instead be used to select a particular product.

Figure 9A:
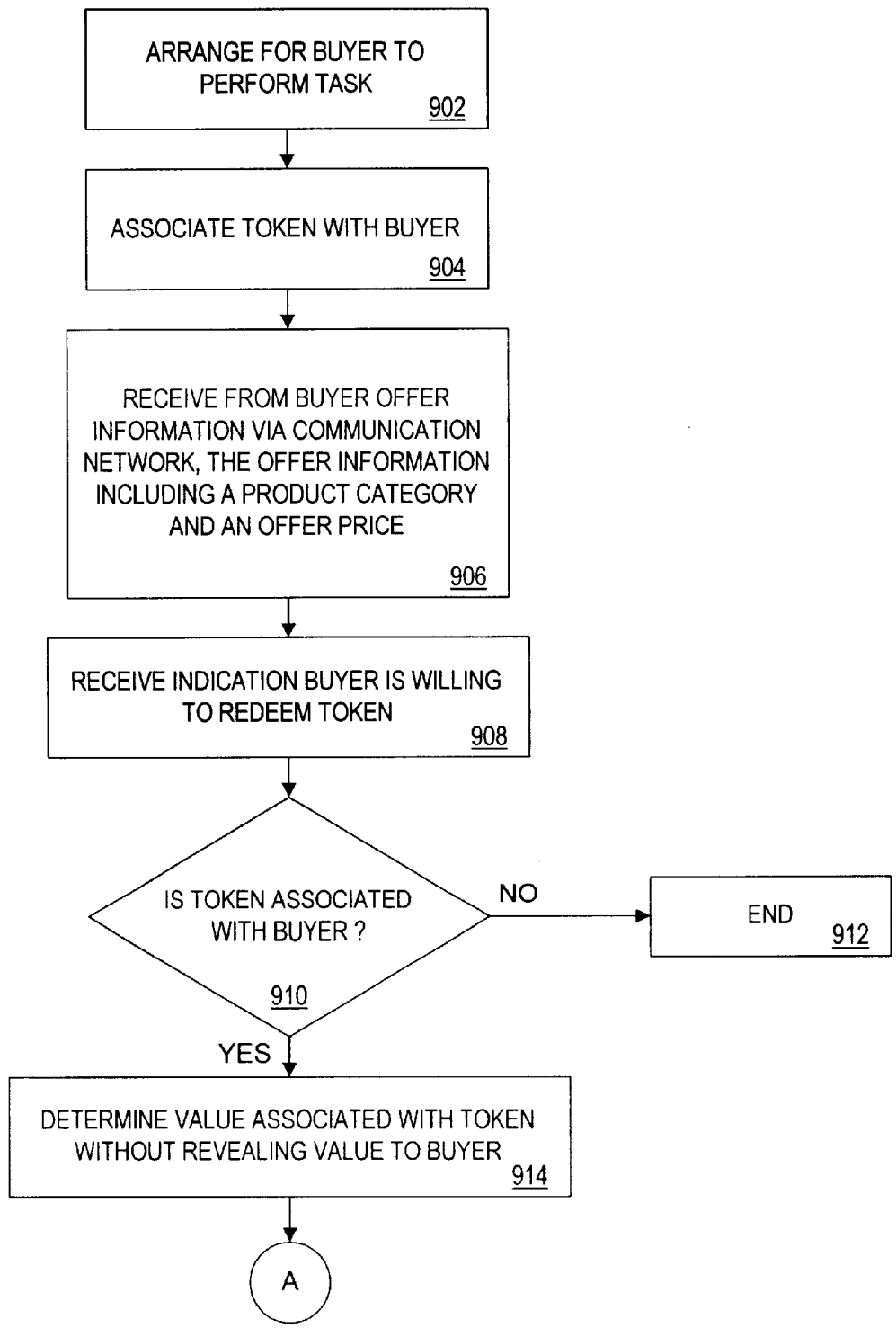
FIGS. 9A and 9B are a flow chart of a transaction method according to another embodiment of the present invention.
Figure 9B:
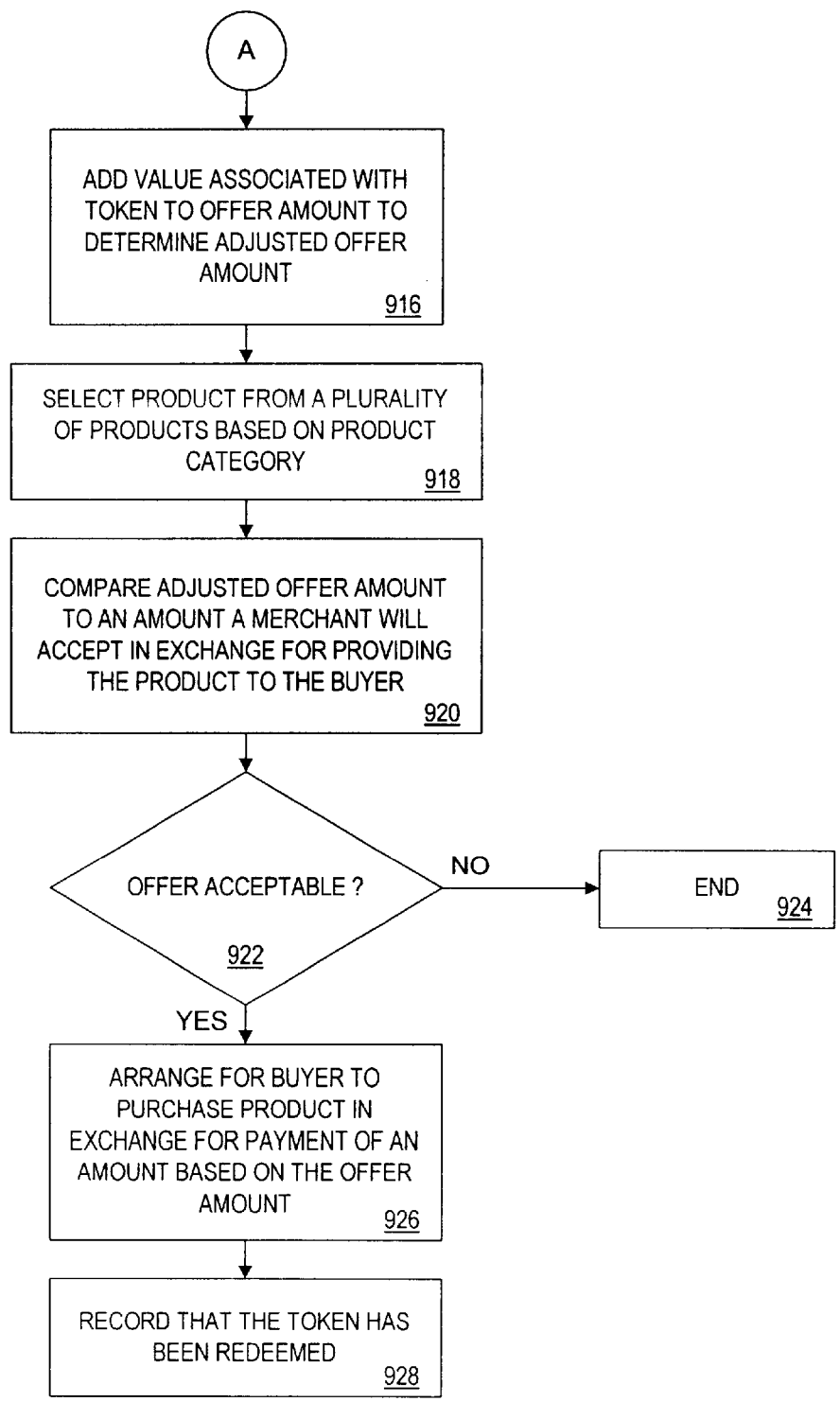

FIGS. 9A and 9B are a flow chart of a transaction method according to an embodiment of the present invention. At 902, it is arranged for the buyer to perform a task, and a token is associated with the buyer in exchange for his or her performance at 904. For example, the buyer may earn ten tokens when he or she test drives a new BMW® automobile. Note that the task may comprise, for example, providing a payment to the controller or promising to perform a task in the future. The task may also comprise, for example, applying for or subscribing to a service, such as a telephone service, an Internet service, a banking service, a credit card account service, an insurance service, a securities trading service, a satellite television service, and/or a cable television service. Other types of tasks include purchasing another product, accessing a Web page, visiting a merchant, dialing a telephone number, providing information, and/or answering a question.

Note that the controller 200 may be willing to provide tokens to buyers because of payments that will be received from subsidy providers. The controller 200 may also, however, be willing to provide tokens in order to encourage certain types of buyer behavior. For example, a token may be associated with a buyer who has recently registered with the controller 200 or who has been inactive for an extended period of time. Similarly, a token may be associated with a buyer based on a transaction history between the buyer and the controller 200. The transaction history may comprise, for example, an amount of profit associated with prior transactions between the buyer and the controller 200 or a total number of prior transactions between the buyer and the controller 200 (e.g., to reward a buyer for using the controller). A token may also be associated with the buyer for any other reason, such for referring a friend who registers with the controller 200.

At 906, offer information is received from a buyer device 20 via a communication network, the offer information including a product category and an offer amount. An indication that the buyer is willing to redeem the token is also received at 908.

At 910, the controller 200 verifies that the token is in fact associated with the buyer. For example, the indication received at 908 may comprise a verifiable token code, in which case the controller 200 may access a database or perform an algorithm to verify the token code. According to other embodiments, the controller 200 may verify that the token can be redeemed for a particular a product or product category. The controller 200 may also verify that the token may be associated with other offer information (e.g., some tokens may only be redeemed by buyers who live in within a set of particular ZIP codes).

At 914, a value associated with the token is determined without revealing the value to the buyer. At 916, the value associated with the token is added to the offer amount to determine an adjusted offer amount.

The controller 200 selects a particular product from a plurality of products based on the product category at 918, and compares the adjusted offer amount to an amount a merchant will accept in exchange for providing the product to the buyer at 920.

If the offer is not acceptable at 922, the process ends at 924. If the offer is acceptable at 922, the controller 200 arranges for the buyer to purchase the product in exchange for payment of an amount based on the offer amount at 926. According to one embodiment, the buyer purchases the product from a party other than the controller 200 (e.g., from a merchant or a manufacturer). According to another embodiment, the buyer provides payment to the controller 200 and takes possession of the product from a party other than the controller (e.g., from a local merchant).

At 928, the controller records that the token has been redeemed by the buyer. For example, the number of available tokens 312 stored in the buyer database 300 may be decreased by the number of tokens offered 410 stored in the offer database 400.

Thus, embodiments of the present invention let a buyer earn and store a right to a benefit (e.g., as a token associated with a subsidy) before indicating a product he or she is to purchase. Moreover, the value of the benefit can be given to a buyer without revealing the current value of the right, enabling the controller 200 to adjust the value to increase its effectiveness.

Additional Embodiments

The following are several examples which illustrate various embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

Consider a buyer who wishes to save money by purchasing grocery items via the transaction system 10. The buyer registers with an online shopping service associated with the controller 200 and agrees to apply for a new credit card in order to earn ten tokens. The controller 200 arranges for the buyer to apply for the new credit card and stores an indication of the stored benefit in the buyer database 300 (i.e., by increasing the number of available tokens 312). The controller 200 also receives a payment from the credit card provider.

The buyer indicates to the controller that he or she is interested in submitting an offer to purchase a loaf of white bread, and that any of HOME PRIDE®, PEPPERIDGE FARM®, or WONDER® brand white bread would be acceptable. The controller 200 informs the buyer that the average retail price per loaf at supermarkets is $1.74. The controller also determines that the maximum value per token is currently $0.95, and suggests to the buyer that he or she submit an offer to pay half of the average retail price (i.e., $1.74/2, or $0.87) and redeem one token. The buyer does so, and the controller 200 selects HOME PRIDE® brand white bread and determines that the buyer's offer is acceptable. The buyer provides payment of $0.87 to the controller 200 and takes possession of a loaf of HOME PRIDE® white bread at a local supermarket. The controller 200 decreases the buyer's number of available tokens 312 by one and provides a payment to the local supermarket (e.g., a payment of an amount based on the actual retail price of a loaf of HOME PRIDE® white bread at the local supermarket).

Although embodiments of the present invention have been described with respect to an buyer offering to purchase a product, similar embodiments may be used with respect to a seller who offers to sell a product. For example, a seller may register with the controller 200 and perform tasks to earn tokens. The seller may then redeem the tokens when offering to sell a product, such as a used product, to buyers. In this case, the controller 200 may add a value associated with the token to a price a buyer pays for a product. Consider a seller who wishes to sell a used bicycle for $100 and who has earned two tokens, each associated with a value of $10. A number of buyers are interested in purchasing a used bicycle, but no buyer has offered to pay more than $85. In this case, the controller 200 may send a message to the seller stating that no buyer has offered to pay $100 for the bicycle, but if the seller would redeem two of his or her tokens such a sale could be arranged. Note that if the controller 200 provides a payment of $100 directly to the seller (and receives a payment of $80 from one of the buyers), the value of the token would not have been revealed to the seller.

According to another embodiment of the present invention, a bidder may similarly earn and redeem tokens when bidding on a product. In this case, the controller 200 may add a value associated with a token to a bid submitted by a bidder.

According to another embodiment, a buyer only offers to redeem one or more stored benefits with respect to a transaction (i.e., the buyer does not offer to pay any money with respect to a transaction). For example, a buyer may offer to redeem three tokens (and no money) in exchange for a product. In this case, a value associated with the tokens may be determined, and the offer may be evaluated based on, for example, the value associated with the tokens and an average retail price associated with the product.

According to another embodiment, the value of a stored benefit may be based on a length of time the stored benefit has been associated with a buyer. For example, a value associated with a token may gradually increase over time (e.g., as "interest" earned by the buyer to encourage the buyer to save his or her tokens). According to another embodiment, the value may instead decrease over time (e.g., to encourage the buyer to use the token as soon as possible).

Note that embodiments of the present invention are not limited to offers that satisfy the legal definition of an "offer" (i.e., are not limited to communications which, if accepted by the seller, will necessarily result in a contract). According to other embodiments, however, a buyer may be bound by the offer information that is submitted to the controller 200. For example, the controller 200 may use the payment identifier 310 stored in the buyer database 300 to automatically charge an account associated with the buyer when it is determined that the offer information is acceptable.

Moreover, although embodiments of the present invention have been described such that the controller 200, the subsidy provider device 30 and the merchant device 40 are associated with separate parties, note that according to other embodiments, the controller 200 may be associated with the subsidy provider and/or the merchant. Similarly, the buyer device 20 may be associated with the controller 200 or another party (e.g., the buyer device 20 may be a kiosk owned and operated by the controller 200 or a supermarket).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of facilitating a transaction, comprising:
    determining, on a processing device, a plurality of suggested offer amounts based on a product category;

transmitting an indication of the plurality of suggested offer amounts to a buyer;

receiving offer information from the buyer, the offer information including an indication of an offer amount selected by the buyer from the plurality of suggested offer amounts;

receiving an indication that the buyer is willing to redeem a stored benefit associated with the buyer;

determining a value associated with the stored benefit;

selecting a product based on the product category; and evaluating the offer information based on: (i) the offer amount, (ii) the value associated with the stored benefit, and (iii) an amount associated with the product.

2. The method of claim 1, wherein said receiving the offer information comprises receiving the offer information via at least one of: (i) a Web site, (ii) the Internet, (iii) a buyer computer, (iv) a personal digital assistant, (v) a kiosk, (vi) an electronic mail message, (vii) a telephone, (viii) an interactive voice response unit, (ix) an operator, and (x) a point of sale terminal.

3. The method of claim 1, wherein the offer information further includes at least one of: a product identifier, a product manufacturer, a product brand, a product description, a product quantity, a product class, at least one product feature, an accessory associated with the product, an age associated with the product, a product condition, a product preference, an offer period, delivery information, and payment information.

4. The method of claim 1, wherein the indication that the buyer is willing to redeem the stored benefit is included in the offer information.

5. The method of claim 1, wherein said receiving the indication that the buyer is willing to redeem the stored benefit comprises receiving a predetermined type of offer.

6. The method of claim 1, wherein the indication that the buyer is willing to redeem the stored benefit comprises a verifiable token code received from a buyer device.

7. The method of claim 1, further comprising:

verifying that the stored benefit is associated with the buyer.

8. The method of claim 1, further comprising:

verifying that the stored benefit may be associated with at least one of: (i) the product, and (ii) the offer information.

9. The method of claim 1, wherein the stored benefit is associated with a plurality of buyers.

10. The method of claim 1, wherein said receiving the indication that the buyer is willing to redeem the stored benefit comprises receiving an indication that the buyer is willing to redeem a number of stored benefits and said evaluating is further based on the number.

11. The method of claim 1, wherein said determining the value associated with the stored benefit is performed without revealing the value to the buyer.

12. The method of claim 1, wherein said determining the value associated with the stored benefit is performed in response to the indication that the buyer is willing to redeem the stored benefit.

13. The method of claim 1, wherein said determining the value associated with the stored benefit is performed prior to receiving the indication that the buyer is willing to redeem the stored benefit.

14. The method of claim 1, wherein said determining the value associated with the stored benefit comprises retrieving a stored value.

15. The method of claim 14, wherein the stored value is calculated based on at least one of: (i) an amount of profit associated with a controller, and (ii) a number of transactions associated with the controller.

16. The method of claim 14, wherein the stored value is manually determined by an operator associated with a controller.

17. The method of claim 14, wherein the stored value is determined by at least one of: (i) a merchant, and (ii) a subsidy provider.

18. The method of claim 1, wherein said determining the value associated with the stored benefit is based on information associated with the buyer.

19. The method of claim 18, wherein the information associated with the buyer comprises at least one of: (i) a transaction history associated with the buyer, (ii) an address associated with the buyer, (iii) demographic information associated with the buyer, (iv) psychographic information associated with the buyer, (v) a credit rating associated with the buyer, and (vi) another offer associated with the buyer.

20. The method of claim 1, wherein said determining the value associated with the stored benefit is based on at least one of: (i) the product and (ii) the product category.

21. The method of claim 1, wherein said evaluating comprises:

adding the value associated with the stored benefit to the offer amount to determine an adjusted offer amount; and comparing the adjusted offer amount to the amount associated with the product.

22. The method of claim 21, wherein the amount associated with the product is based on an amount a merchant will accept in exchange for providing the product to the buyer.

23. The method of claim 21, further comprising:

subtracting the amount associated with the product from the adjusted offer amount to determine an excess offer amount;

storing an indication of the excess offer amount for use with respect to another transaction.

24. The method of claim 23, wherein the other transaction is associated with the buyer.

25. The method of claim 1, wherein said evaluating comprises:

determining a probability that an offer will be accepted based on: (i) the offer amount, (ii) the value associated with the stored benefit, and (iii) the amount associated with the product.

26. The method of claim 1, wherein said evaluating is further based on at least one of: (i) another pending offer associated with the buyer; and (ii) a number of stored benefits associated with the buyer.

27. The method of claim 1, further comprising:

calculating a suggested number of stored benefits; and providing an indication of the suggested number of stored benefits to the buyer.

28. The method of claim 27, wherein said calculating comprises:

subtracting the amount associated with the product from the offer amount to determine a difference; and dividing the difference by the value associated with the stored benefit.

29. The method of claim 1, further comprising:

determining that an initial offer from the buyer will not be accepted prior to receiving the indication that the buyer is willing to redeem the stored benefit.

30. The method of claim 29, further comprising:

providing an indication of a suggested number of stored benefits to the buyer after said determination that the initial offer will not be accepted.

31. The method of claim 1, further comprising:

arranging for the buyer to purchase the product in exchange for payment of an amount based on the offer amount.

32. The method of claim 31, wherein said arranging is performed by a controller and the buyer purchases the product from a party other than the controller.

33. The method of claim 31, wherein the buyer provides the payment to a controller and takes possession of the product from a party other than the controller.

34. The method of claim 1, further comprising:

recording that the stored benefit has been redeemed by the buyer.

35. The method of claim 1, further comprising:

arranging for the buyer to perform a task; and associating the stored benefit with the buyer based on the performance of the task.

36. The method of claim 35, wherein said associating is performed prior to receiving the offer information.

37. The method of claim 35, wherein said evaluating is performed by a controller and the task is associated with a subsidy provider.

38. The method of claim 35, wherein the task comprises at least one of: (i) applying for a service, and (ii) subscribing to a service.

39. The method of claim 38, wherein the service comprises at least one of: (i) a telephone service, (ii) an Internet service, (iii) a banking service, (iv) a credit card account service, (v) an insurance service, (vi) a securities trading service, (vii) a satellite television service, and (viii) a cable television service.

40. The method of claim 35, wherein the task comprises at least one of: (i) purchasing another product, (ii) accessing a Web page, (iii) visiting a merchant, (iv) dialing a telephone number, (v) providing information, and (vi) answering a question.

41. The method of claim 1, further comprising:

associating the stored benefit with the buyer based on a transaction history between the buyer and a controller.

42. The method of claim 41, wherein the transaction history comprises at least one of: (i) an amount of profit associated with prior transactions between the buyer and the controller, and (ii) a total number of prior transactions between the buyer and the controller.

43. The method of claim 1, wherein (i) said receiving the offer information and said receiving the indication that the buyer is willing to redeem the stored benefit are performed by a controller, and (ii) said evaluating is performed by a party other than the controller.

44. The method of claim 1, wherein said receiving the offer information, said receiving the indication that the buyer is willing to redeem the stored benefit, and said evaluating are performed by a controller.

45. A method of facilitating a transaction, comprising:

determining, on a processing device, a plurality of suggested offer amounts based on a product category;

transmitting an indication of the plurality of suggested offer amounts to a buyer;

receiving offer information from the buyer, the offer information including an indication of an offer amount selected by the buyer from the plurality of suggested offer amounts;

evaluating the offer information to determine that the offer information is not acceptable based on the offer amount;

receiving an indication that the buyer is willing to redeem a stored benefit associated with the buyer; and re-evaluating the offer information to determine that the offer information is acceptable based on the stored benefit.

46. A method of facilitating a transaction, comprising:

arranging for a buyer to perform a task;

associating a stored benefit with the buyer based on the performance of the task;

determining, on a processing device, a plurality of suggested offer amounts based on a product category;

transmitting an indication of the plurality of suggested offer amounts to the buyer;

receiving an offer to purchase a product from the buyer, the offer including an indication of an offer amount selected by the buyer from the plurality of suggested offer amount;

receiving an indication that the buyer is willing to redeem the stored benefit; and determining a probability that the offer from the buyer will be accepted based on: (i) the offer amount, (ii) an amount associated with the stored benefit, and (iii) an amount associated with the product.

47. An apparatus for facilitating a transaction, comprising:

a processor; and a storage device coupled to said processor and storing instructions adapted to be executed by said processor to:

determine a plurality of suggested offer amounts based on a product category;

transmit an indication of the plurality of suggested offer amounts to a buyer;

receive offer information from a buyer, the offer information including an indication of an offer amount selected by the buyer from the plurality of suggested offer amounts;

receive an indication that the buyer is willing to redeem a stored benefit associated with the buyer;

determine a value associated with the stored benefit;

select a product based on the product category; and evaluate the offer information based on: (i) the offer amount, (ii) the value associated with the stored benefit, and (iii) an amount associated with the product.

48. The apparatus of claim 47, further comprising:

a communication port coupled to said processor and adapted to communicate with at least one of: (i) a buyer device, (ii) a subsidy provider device, and (iii) a merchant device.

49. The apparatus of claim 47, wherein said storage device further stores at least one of: (i) a buyer database, (ii) an offer database, (iii) a product database, and (iv) a transaction database.

50. A medium storing instructions adapted to be executed by a processor to perform a method for facilitating a transaction, said method comprising:

determining a plurality of suggested offer amounts based on a product category;

transmitting an indication of the plurality of suggested offer amounts to a buyer;

receiving offer information from the buyer, the offer information including an indication of an offer amount selected by the buyer from the plurality of suggested offer amounts;

receiving an indication that the buyer is willing to redeem a stored benefit associated with the buyer;

determining a value associated with the stored benefit;

selecting a product based on the product category; and evaluating the offer information based on: (i) the offer amount, (ii) the value associated with the stored benefit, and (iii) an amount associated with the product.

* * * * *